United States Patent
Chih et al.

(10) Patent No.: US 12,494,250 B2
(45) Date of Patent: Dec. 9, 2025

(54) RESISTIVE RANDOM ACCESS MEMORY BASED ONE-TIME-PROGRAMMABLE MEMORY DEVICES

(71) Applicant: Taiwan Semiconductor Manufacturing Company, Ltd., Hsinchu (TW)

(72) Inventors: Yu-Der Chih, Hsinchu (TW); Chung-Cheng Chou, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 189 days.

(21) Appl. No.: 18/331,570

(22) Filed: Jun. 8, 2023

(65) Prior Publication Data

US 2024/0412785 A1    Dec. 12, 2024

(51) Int. Cl.
   *G11C 11/00* (2006.01)
   *G11C 13/00* (2006.01)
   *G11C 17/14* (2006.01)
   *G11C 17/16* (2006.01)
   *G11C 17/18* (2006.01)

(52) U.S. Cl.
   CPC ........ *G11C 13/0069* (2013.01); *G11C 13/003* (2013.01)

(58) Field of Classification Search
   CPC .............. G11C 13/0069; G11C 13/003; G11C 2013/0054; G11C 11/00; G11C 2013/0071; G11C 2013/0083; G11C 2213/79; G11C 13/0007; G11C 13/004; G11C 13/0059; G11C 17/16; G11C 17/165; G11C 17/18; G11C 17/14; G11C 13/0009; G11C 13/0021
   See application file for complete search history.

(56) References Cited

U.S. PATENT DOCUMENTS

| | | | |
|---|---|---|---|
| 6,035,401 A * | 3/2000 | Dalvi | G11C 16/22 714/746 |
| 7,911,839 B2 | 3/2011 | Ahmed | |
| 10,726,914 B2 | 7/2020 | Chung | |
| 11,495,313 B1 | 11/2022 | Kirschner | |
| 12,100,449 B1 * | 9/2024 | Nazarian | G11C 13/0069 |
| 2022/0336012 A1 * | 10/2022 | Chang | G11C 13/0069 |
| 2022/0351774 A1 * | 11/2022 | Chang | G11C 13/004 |
| 2023/0005538 A1 * | 1/2023 | Jo | H04L 9/3278 |

OTHER PUBLICATIONS

Office Action issued in connection with Taiwan Appl. No. 112143534 dated Oct. 25, 2024.

* cited by examiner

*Primary Examiner* — Son T Dinh
*Assistant Examiner* — Elizabeth Rose Agger
(74) *Attorney, Agent, or Firm* — FOLEY & LARDNER LLP (57) ABSTRACT

A memory device includes a first memory array including a plurality of first memory bits. Each of the plurality of first memory bits is configured as a one-time-programmable (OTP) memory bit. A second memory array includes a plurality of second memory bits, each of the plurality of second memory bits being configured as a multi-time-programmable (MTP) memory bit. A lock bit circuit operatively coupled to the first memory array and not the second memory array. The lock bit circuit is configured to generate a lock bit indicative of whether at least one of the plurality of first memory bits has been programmed.

20 Claims, 5 Drawing Sheets

RESISTIVE RANDOM ACCESS MEMORY BASED ONE-TIME-PROGRAMMABLE MEMORY DEVICES

BACKGROUND

With the increasing use of integrated circuits in electronic devices that provide different types of information for a variety of different applications, there has been an increasing need to adequately protect sensitive and/or critical information that may be stored within an electronic device to limit access to such information to only other devices that have permission to access the information. Some examples of applications include the authentication of devices, protection of confidential information within a device, and securing a communication between two or more devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A one-time-programmable (OTP) memory device is one type of the non-volatile memory device utilized in integrated circuits for adjusting the circuitry after fabrication of an integrated circuit. For example, the OTP memory device is used for providing repair information that controls the usage of redundant cells in replacing defective cells of a memory array. Another use is for tuning analog circuitry by trimming a capacitive or resistive value of an analog circuit or enabling and disabling portions of the system. A recent trend is that the same product is likely to be manufactured in different fabrication facilities though in a common process technology. Despite best engineering efforts, it is likely that each facility will have a slightly different process. Usage of OTP memory devices allows independent optimization of the product functionality for each manufacturing facility.

As integrated circuit technology advances, integrated circuit features (e.g., the width of interconnect structures) have been decreasing, thereby allowing for more circuitry to be implemented in an integrated circuit. While implementing OTP memory devices such as, for example, a fuse, an electronic fuse (efuse), etc., in an integrated circuit, it may encounter various challenges. For example, with the decreasing width of interconnect structures, in general, respective dimensions of one or more fuse components of the OTP memory devices shrink accordingly. Given the continuously shrunk dimensions of the fuse components, it can become significantly challenging to program (e.g., burn down) the fuse components. Thus, the existing OTP memory devices have not been entirely satisfactory in many aspects.

The present disclosure provides various embodiments of an OTP memory device (or OTP solution) that stores private codes in a portion/area of a resistive random access memory (RRAM) cell array. The private codes (e.g., unique resistance states) can be used in the RRAM cell array, for instance, to encode/encrypt and/or decode/decrypt the data for individual RRAM cell, thereby improving the security of data storage. In particular, a portion of an RRAM is configured or allocated for OTP purposes (e.g., OTP memory device or component), and other portions of the RRAM are configured or allocated for multiple-time programmable purposes (e.g., regular RRAM of a memory device). The OTP allocated RRAM can be referred to as an RRAM OTP. The features, functionalities, or content of the RRAM OTP can be programmed or configured at a chip probing (CP) test, final test (FT), or in-field test stage during the manufacturing of the RRAM. For example, the systems and methods discussed herein provide a memory device configured to operate an RRAM to emulate or replicate a logic output (e.g., '0' or '1') depending on whether the RRAM is breakdown or unformed. An unformed RRAM can emulate logic '0', whereas a breakdown (e.g., voltage forming) RRAM can emulate logic '1' or vice versa depending on the structure of the circuit. The memory device can achieve the desired or expected reliability performance using RRAM to emulate the logic (binary) output. However, certain situations may cause the RRAM to have limited OTP program capability due to the high operation voltage by the breakdown (or strong SET operation), such as in-field. Hence, the memory device of the technical solution discussed herein can leverage a low-program approach to perform RRAM OTP (e.g., method of programming memory devices to minimize programming required to store data as discussed herein).

In various implementations, the OTP memory device can include an RRAM cell array. The RRAM cell array can correspond to or be a portion of an RRAM (including multiple RRAM cell arrays). The RRAM cell array of the OTP memory device is allocated for OTP operation. Other portions of the RRAM (e.g., other RRAM cell arrays) are configured for MTP operation. The OTP memory device can include a lock-bit generation circuit. The lock-bit generation circuit (e.g., lock-bit generator) can be (e.g., electrically) coupled with the RRAM cell array. Depending on the state or configuration of the RRAM cell array, the lock-bit generator can output a logic '0' or a logic '1' (e.g., the logical output of a logic gate), such as to indicate whether the OTP memory device has been programmed. For example, the logic '0' can indicate that that the OTP memory device has not been programmed and the logic '1' can indicate that the OTP memory device has been programmed.

In various configurations, the RRAM cell array can be programmed using a smart write function or algorithm to allow retriable write operations. The function/algorithm can be executed by a controller (e.g., RRAM controller). The lock-bit generator is implemented to enable or allow a single polar direction write operation to the RRAM cell (e.g., one-time write operation). With the single polar direction write operation, a reverse write may not be performed after programming the RRAM cell array, thereby achieving the OTP function. In certain aspects, the lock-bit generator acts as a flag or an indication indicating that the RRAM cell array has been programmed. Upon triggering the flag, read operation may be performed on the associated RRAM cell array (allocated for OTP function) and the write/program operation is deactivated when the lock-bit is flagged (e.g., logic '1' output from the lock-bit generator). Hence, by utilizing RRAM for OTP operation, the systems and methods of the technical solution discussed herein can provide an area-effective OTP solution that stores private codes (e.g., codes for encoding and/or decoding data) in a regular RRAM cell array, where the one lock_bit is operated for the OTP solution. Further, the systems and methods can program the content of the OTP RRAM at CP, FT, or in-field while the lock-bit has not been programmed. After programming the content, the lock-bit can be programmed, such that the systems and methods is locked from programming (e.g., no longer able to program) the OTP RRAM, for example.

Figure 1:
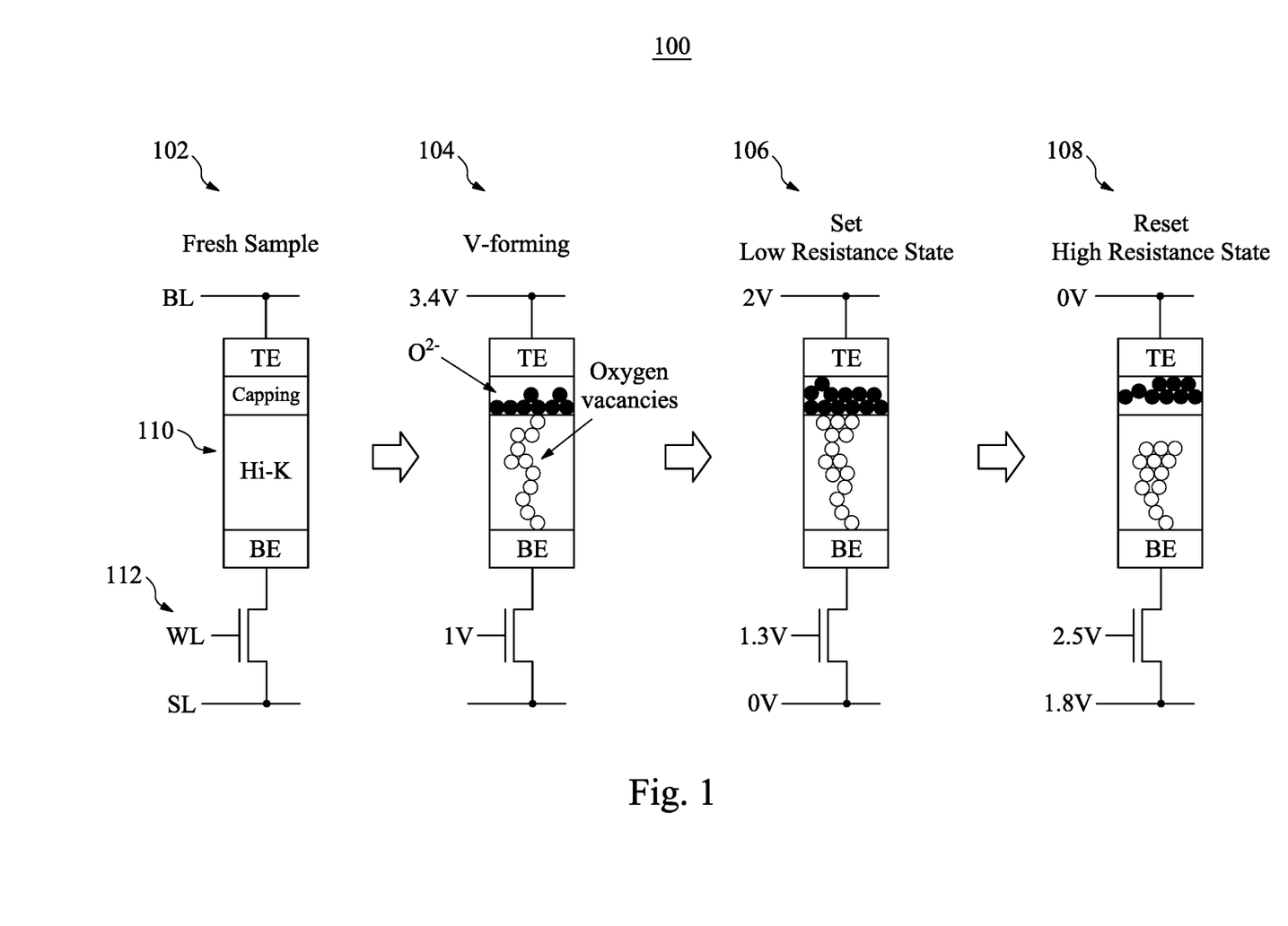
FIG. 1 illustrates a cross-sectional view of a resistive random access memory (RRAM) operation, in accordance with some embodiments.

Referring now to FIG. 1, depicted is a cross-sectional view of an RRAM operation 100, in accordance with various embodiments. An RRAM has a switching mechanism configured for changing the resistance, such as from a relatively high resistance to a relatively low resistance or vice versa. The cross-sectional view of FIG. 1 shows the changes to an RRAM cell array at different stages of the RRAM operation 100. The RRAM cell array can be a part of a memory device including a plurality of RRAM cell arrays.

The RRAM cell of the RRAM cell array can be implemented as a 1-transistor-1-resistor (1T1R) structure. The RRAM cell array includes or is composed of at least the resistor 110 (e.g., variable resistor 110) serially connected to a transistor 112. However, any of a variety of structures that exhibits the characteristic of variable resistance may be included in the RRAM cell, such as a 1-diode-1-resistor (1D1R) structure, a 1-transistor-many resistors (1T-manyR) structure, a cross-bar structure, an eFuse device, an anti-eFuse device, etc., while remaining within the scope of the present disclosure.

In some embodiments, the resistor 110 of the RRAM cell of the RRAM cell array is formed as a multi-layer stack that includes a top electrode (TE), a capping layer, a variable resistance dielectric (VRD) layer, and a bottom electrode (BE). In some embodiments, the TE may be formed from at least one of the materials selected from: Pt, TiN/Ti, TiN, Ru, Ni, and combinations thereof; the capping layer may be formed from at least one of the transition metal materials (e.g., materials capable of forming a variety of oxidation states), such as Ti, Ni, Hf, Nb, Co, Fe, Cu, V, Ta, W, Cr, and combinations thereof; the VRD layer may be formed from at least one of the transition metal oxide materials (e.g., transition metal boded with oxygen), such as TiOx, NiOx, HfOx, NbOx, CoOx, FeOx, CuOx, VOx, TaOx, WOx, CrOx, and combinations thereof; and the BE may be formed of at least one of the materials selected from: TiN, TaN, W, Pt, and combinations thereof. In some embodiments, the VRD layer may include or correspond to a high-k dielectric layer. In general, the VRD layer may be formed by deposition, for example, atomic layer deposition (ALD), chemical vapor deposition (CVD), metal-organic chemical vapor deposition (MOCVD), etc., to have a particular thickness and crystalline structure using a particular manufacturing process recipe.

As described above, each RRAM cell further includes a transistor 112 coupled to the respective resistor 110, in series. In some embodiments, such a transistor is typically referred to as a "selection transistor," or an "enablement transistor" that is configured to enable a conduction path to flow through the coupled resistor 110. As shown in FIG. 1, the selection transistor 112 is coupled to the resistor 110, in series. Further, in some embodiments, the TE is coupled to a bit-line (BL) and is configured to receive a set/reset voltage (e.g., voltage or signal indicative of a set or reset command); a drain of the selection transistor 112 is coupled to the BE, a gate of the selection transistor 112 is coupled to a word-line (WL) and is configured to receive one or more WL assertion signals so as to enable the corresponding RRAM cell to be accessed, and a source of the transistor 112 is coupled to a select-line (SL) and is configured to receive the above-mentioned set/reset voltage.

As discussed herein, the transistor 112 can be one of any type of transistor suitable for the RRAM cell, such as bipolar junction transistor (BJT), field-effect transistor (FET) (e.g., N-channel or P-channel), or insulated-gate bipolar transistor (IGBT), among others. For simplicity, the transistor 112, or other transistors discussed herein, can be an n-channel metal-oxide semiconductor (nMOS) transistor, for example. The transistor 112 may operate similarly to a switch. For instance, the transistor 112 allows current to pass through when on and does not allow current to pass through when off, thereby allowing the write or read operation on the memory cell (e.g., RRAM cell). The BL, WL, and SL are configured to carry signals or electricity to or from one or more elements/components of the RRAM cell.

The resistor 110 is constructed with variable resistance such that changes to the voltage (e.g., applied at/on the terminal (or end) of the resistor 110) can change the resistance of the resistor 110 from a first resistance stage to a second resistance stage. For example, at operation 102, a fresh (new) sample of the RRAM cell is shown. The fresh sample of the RRAM cell may refer to a stage after the formation of the RRAM cell. During this stage, the resistor 110 is in a relatively high resistance state (e.g., megaohm range). At operation 104, a vacancies-forming (v-forming) stage for the RRAM cell is shown. During the v-forming stage, oxygen vacancies can be formed in the Hi-K dielectric layer of the resistor 110 by providing a certain voltage (e.g., predefined/predetermined voltage) at least at the BL, thereby allowing for oxygen vacancies in the Hi-K dielectric layer.

By forming the oxygen vacancies, the RRAM cell can be enabled to perform read or write operations.

Subsequent to forming the oxygen vacancies, the resistor 110 can be set or reset. At operation 106, the resistor 110 can be set by applying a relatively smaller voltage (compared to the voltage applied during the v-forming stage) at BL. Responsive to applying this voltage, more oxygen vacancies are formed in the resistance field, thereby increasing the conductivity of the Hi-K dielectric layer. The increase in the conductivity of the Hi-K dielectric layer results in a relatively lower resistance state of the resistor 110, which can be utilized herein to indicate that the RRAM cell has been programmed, for example.

In certain devices, operation 108 may be performed to reset the resistor 110. In this case, voltage is applied to the RRAM cell (e.g., at the transistor 112) to breakdown the oxygen vacancies breach, thereby making the Hi-K dielectric layer become more dielectric (e.g., increasing the resistance of the resistor 110). Hence, in such devices, the reset operation can be performed to increase (or reset) the resistance of the resistor 110. In various implementations discussed herein, the reset mode (e.g., operation 108) may be removed from the operation or modes of the RRAM cell discussed herein (e.g., to perform the OTP operations for a particular RRAM cell array). The RRAM cell of FIG. 1 may correspond to or be described in conjunction with RRAM cell array 212 of FIG. 2.

Figure 2:
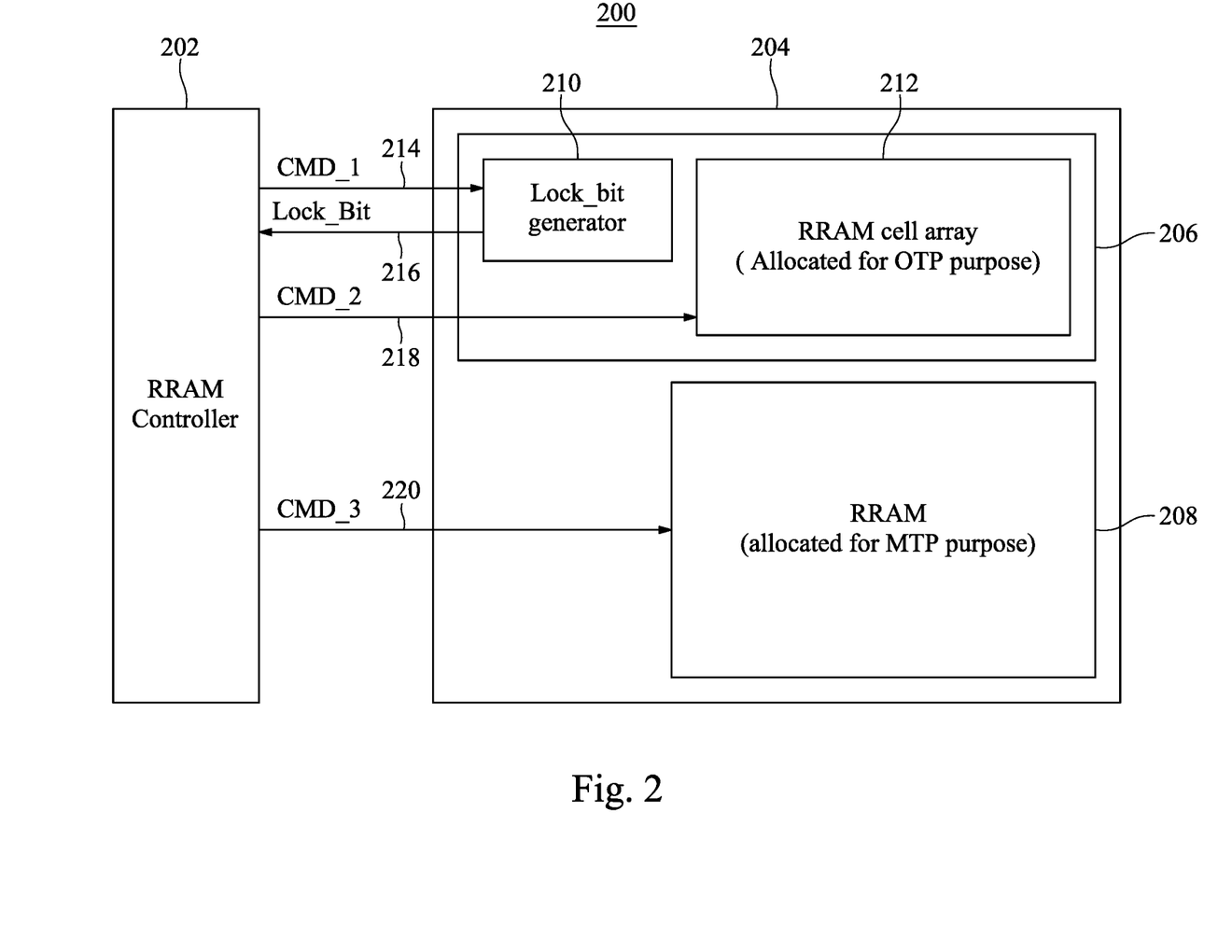
FIG. 2 illustrates a block diagram of a system including an RRAM one-time-programmable (OTP) component, in accordance with some embodiments.

Referring to FIG. 2, depicted is a block diagram of a system 200 including an RRAM one-time-programmable (OTP) component 206 (hereinafter "component"), in accordance with various embodiments. The RRAM OTP component 206 can include or be implemented with one or more RRAM cells, such as described in conjunction with FIG. 1. The system 200 includes at least one RRAM controller 202 and at least one memory device 204. The memory device 204 includes an RRAM cell array 208 (hereinafter "array") and the component 206. The component 206 includes an RRAM cell array 212 (hereinafter "array") and a lock bit generator 210. In some implementations, the array 212 may be a portion/part of array 208, where the arrays 208, 212 can form a single RRAM cell array (e.g., arrays 208, 212 may form or be a part of the single RRAM cell array) of the memory device 204, for example. For example, the arrays 208, 212 may represent portions of the single RRAM cell array allocated for different purposes. The array 208 is allocated for MTP and the array 212 is allocated for OTP. In some cases, the RRAM cell of FIG. 1 can be implemented or used, for instance, as part of the array 208 and/or array 212 discussed herein.

In some embodiments, each of the arrays 208, 212 includes a plurality of bits, and, more specifically, each bit includes two RRAM cells, wherein each bit's respective RRAM cells are substantially similar to each other. In general, as discussed in further detail below with respect to FIG. 2, in addition to the top electrode, the optional capping layer, the variable resistance dielectric layer, and the bottom electrode that form a resistor (with variable resistance), each RRAM cell further includes a transistor coupled, in series, to the resistor (e.g., similar or corresponding to resistor 110 of FIG. 1). As such, in some embodiments of the present disclosure, each RRAM cell may include three nodes/terminals that are each coupled to a bit line (BL), a word line (WL), and a selector line (SL), respectively. Accordingly, in some embodiments, each bit, comprising two RRAM cells, may include six terminals that are coupled to a first set of BL, WL, and SL, and a second set of BL, WL, and SL, respectively.

In various configurations, the RRAM controller 202 (hereinafter "controller") can be a part of the memory device 204, such as a control logic circuit configured to control or provide instructions to components of the memory device 204. The controller 202 is configured to control each of the elements or components of the memory device 204, such as the arrays 208, 212, and the lock bit generator 210. For example, the controller 202 can provide or send commands (a first command 214 (CMD_1)) to control the lock bit generator 210. The controller 202 can send commands (a second command 218 (CMD_2)) to access array 212 (e.g., OTP RRAM array) based on a lock bit 216 received from the lock bit generator 210. The controller 202 can send commands (a third command 220 (CMD_3)) to access array 208 (e.g., MTP RRAM array).

The controller 202 can perform the read or write operations on the arrays 208, 212. For array 208, the controller 202 may perform multiple write operations to program or re-program the array 208. For array 212, the controller 202 may perform a single write operation (e.g., program the array 212 once). After programming the array 212, the controller 202 can disable or lock write operation from being performed on the array 212 based on the lock bit 216. In various configurations, the controller 202 receives the lock bit 216 from the lock bit generator 210. The lock bit generator 210 can generate the lock bit 216 at a first logic state if determining that the array 212 has been programmed, and at a second logic state if determining that the array 212 has not been programmed. Upon receiving the lock bit 216, the controller 202 can identify that the array 212 has been programmed. As will be discussed below, the array 212 is configured with a uni-polar write path (e.g., a write operation involving one polarity, such as high level (logic '1') or low level (logic '0')) to prevent a reset from occurring (e.g., preventing operation 108). That is, once the array 212 has been programmed, it cannot be programmed again.

Figure 3:
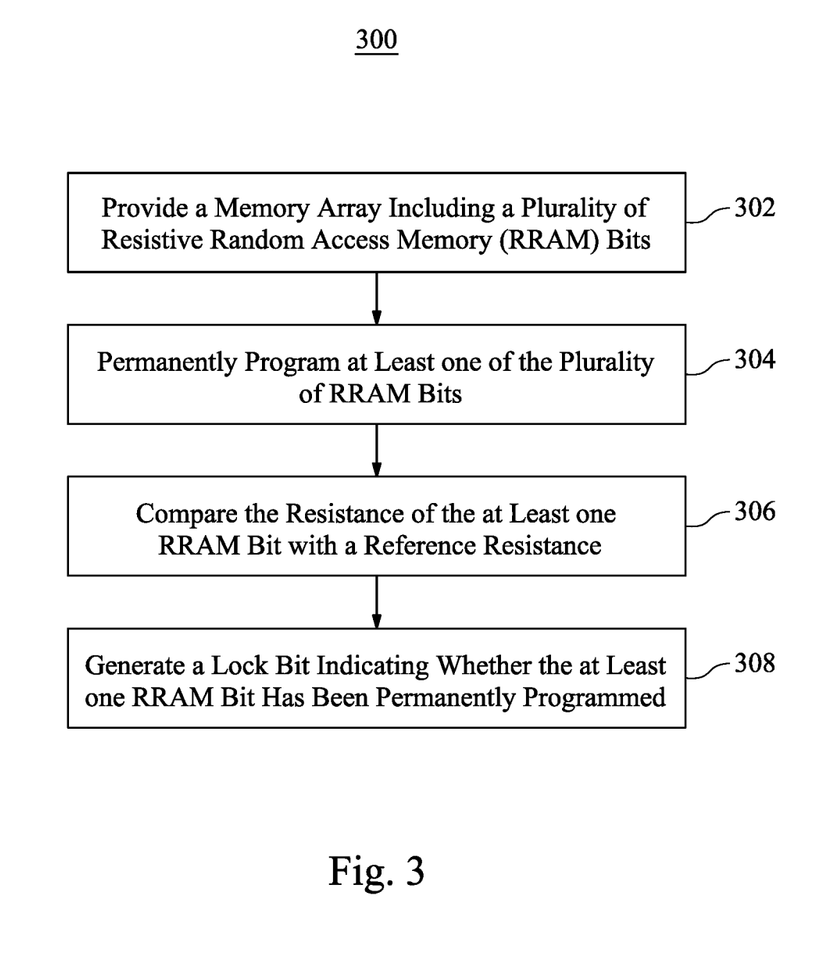
FIG. 3 is an example flow chart of a method for providing the RRAM OTP, in accordance with some embodiments.

Referring now to FIG. 3, depicted is a flowchart illustrating an example method 300 for providing or forming RRAM OTP component 206, according to various aspects of the present disclosure. The method 300 may include or be a part of the operations as described in conjunction with at least one of FIGS. 1-2. The method 300 may be described in conjunction with FIGS. 4-5, such as to provide the RRAM OTP component 206 for one-time programming of the array 212, for example.

At least some operations of the method 300 can be used to form the RRAM OTP component 206. For example, the method 300 provides operations, features, or functionalities of the lock bit generator 210 and the array 212 that forms or are parts of the component 206, including but not limited to operations 302-308. It should be noted that the method 300 is merely an example, and is not intended to limit the present disclosure. Accordingly, it should be understood that additional operations may be provided before, during, and/or after the method 300, and that some other operations may only be briefly described herein. The following discussions of the method 300 may refer to one or more components or features of the components of FIGS. 1-2 and/or 4-5.

In brief overview, the method 300 includes providing a memory array including RRAM bits, at operation 302. At operation 304, the method 300 includes permanently programming at least one of the RRAM bits. At operation 306, the method 300 includes comparing the resistance of the at least one RRAM bit with a reference resistance. At operation 308, the method 300 includes generating a lock bit (e.g., the lock bit 216) indicating whether the at least one RRAM bit has been permanently programmed.

Figure 4:
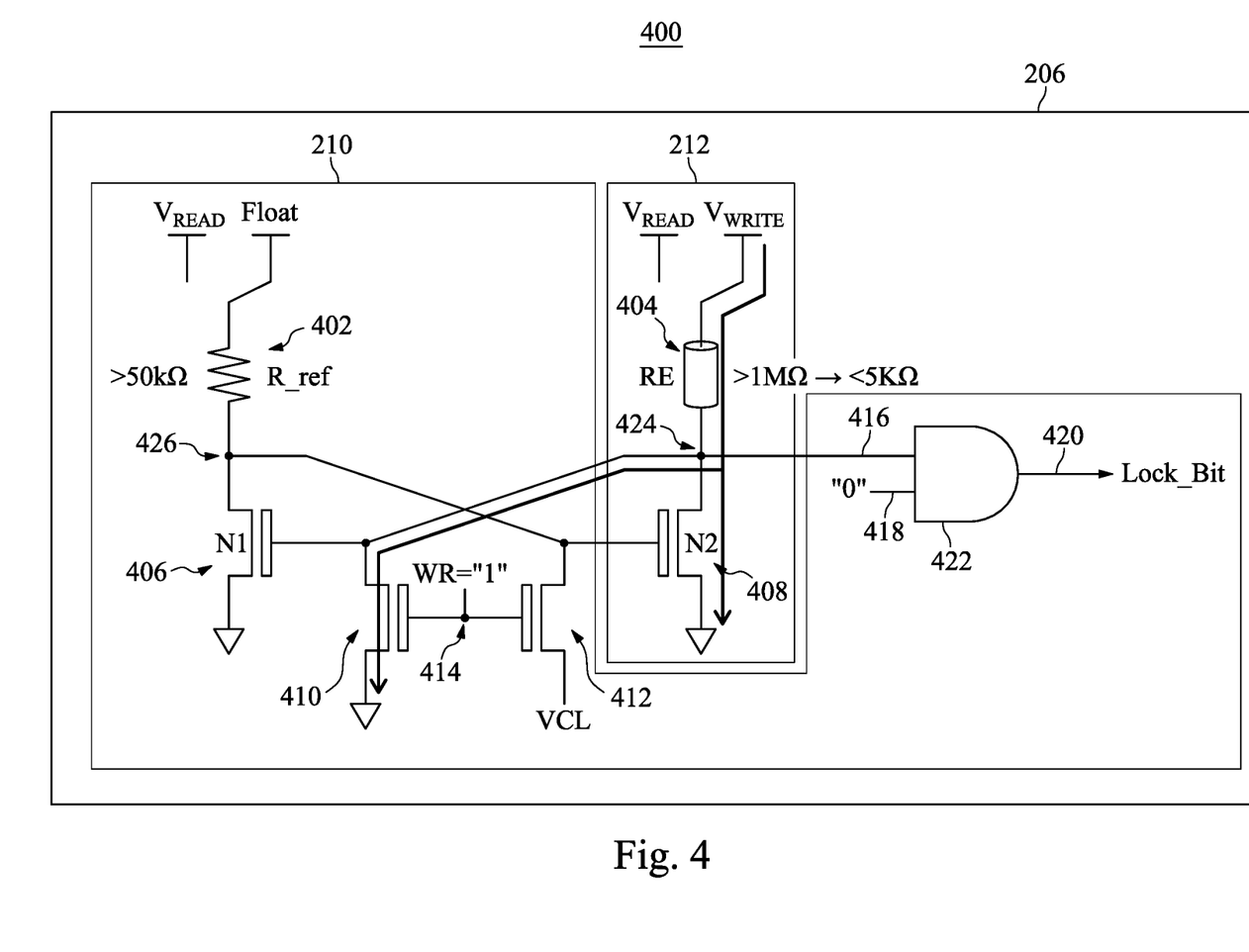
FIG. 4 illustrates a circuit of the RRAM OTP component operating in program mode, in accordance with some embodiments.
Figure 5:
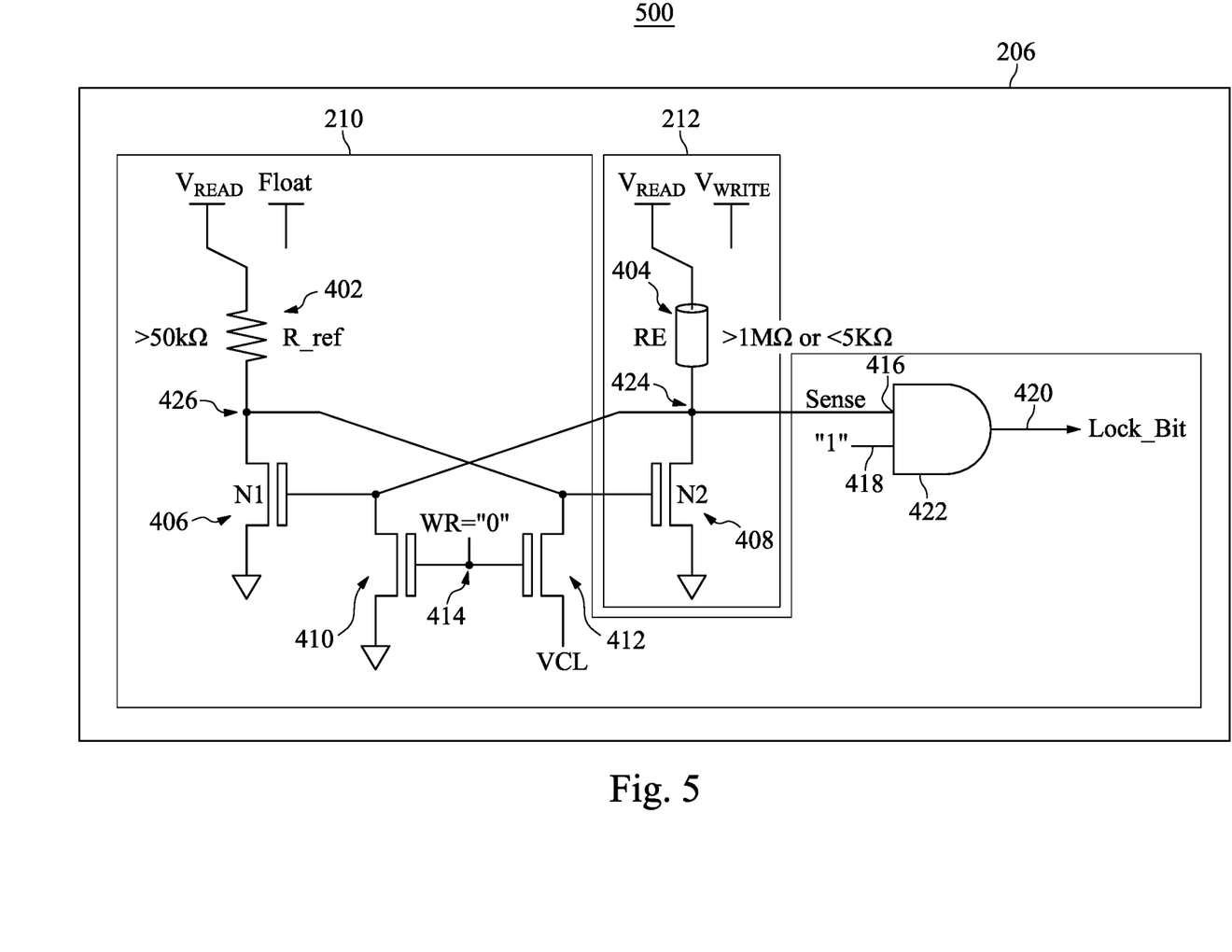
FIG. 5 illustrates a circuit of the RRAM OTP component operating in read mode, in accordance with some embodiments.

Referring to FIGS. 4-5, depicted are circuits of the RRAM OTP component 206 operating in write mode (e.g., circuit 400) and read mode (e.g., circuit 500), respectively. In some implementations, the circuits 400, 500 of FIGS. 4-5 may include more or fewer components, for instance, including other components as described in conjunction with at least FIGS. 1-2, such as resistor 110 performing the features of at least resistor 404. As mentioned above, the structure of the circuits 400, 500 of FIGS. 4-5 can be described in conjunction with the method 300. The circuits 400, 500 may include hardware and/or software components as described in FIGS. 1-2. For example, the resistor 404 can be composed of similar materials or perform one or more features or functionalities similar to the resistor 110 of FIG. 1, and further, the resistor 404 and its corresponding transistor 408 can serve as an RRAM OTP to generate a lock bit. In another example, the circuits 400, 500 of FIGS. 4-5 can show one or more components associated with or included as part of the component 206. It should be understood that the structures or elements shown in FIGS. 4-5 may include a number of other components (e.g., additionally or alternatively), such as different logic gates, resistors, transistors, voltage sources, etc., which are not shown in FIGS. 4-5, for purposes of clarity of illustration. In various configurations, the circuits 400, 500 can be a part of the memory device 204, including a memory array (e.g., array 212) and a lock bit circuit 210 (e.g., lock bit generator 210). The circuits 400, 500 include at least a first variable resistor 404 (e.g., configured to perform one or more operations similar to resistor 110), e.g., operatively coupled in series with a first access transistor 408, a reference resistor 402 coupled in series with a reference transistor 406, the first access transistor 408 and the reference transistor cross-coupled with one another, a first clamping transistor 410 and a second clamping transistor 412 configured as a clamping circuit, and a logic gate 422 for generating a logic bit 420. As discussed herein, the components of the circuits 400, 500 can be arranged or structured for OTP operation, such as by permanently programming the variable resistor (e.g., permanently changing the resistance) to be an indicator that the memory array has been programmed, for example.

Corresponding to operation 302 of FIG. 3, the component 206 of FIGS. 4-5 is a part of the memory device 204 providing one or more memory arrays, such as a first memory array (e.g., array 212, such as for OTP purposes) and a second memory array (e.g., array 208, such as for MTP purposes). The component 206 can include or be formed or structured with various parts or components, such as described in conjunction with FIGS. 4-5, including but not limited to resistors 402, 404, transistors 406, 408, 410, 412, etc. Each of the memory arrays includes multiple memory bits, such as first memory bits for the first memory array and second memory bits for the second memory array. The memory bits can be RRAM bits. Each of the first memory bits of the first memory array is configured as an OTP memory bit (e.g., programmable one time).

For example, each of the first memory bits of the first memory array includes a first access transistor 408 and the first (variable) resistor/resistance 404 (e.g., similar to resistor 110) coupled in series. The first variable resistor 404 is formed with (or having) a first resistance (e.g., initial resistance state at or after the v-forming stage (e.g., operation 104)). The first variable resistor 404 is configured to be programmed to a second resistance, such as by applying or changing (e.g., increasing or decreasing) the voltage applied at the terminal of the first variable resistor 404 (e.g., Vwrite voltage applied to one of the terminals of the resistor 404).

In various configurations discussed herein, the second resistance is substantially lower than the first resistance, such as changing from greater than 1M ohm as the first resistance to less than 5K ohm as the second resistance. In some implementations, according to the voltage applied at the terminal of the first variable resistor 404 (among other variable resistors), the first variable resistor 404 can be adjusted to other resistance, such as at or between 1M ohm and 5K ohm, for example.

Further, as shown in circuits 400 and 500, the component 206 includes a lock bit circuit 210. The lock bit circuit 210 includes a reference resistor 402 (e.g., labeled as R_ref) having a fixed resistance (e.g., pre-selected or configured), such as at least 50 k ohm, although other predetermined resistances can be implemented for the reference resistor 402. In some embodiments, a resistance value of the reference resistor 402 may be selected between the first resistance and the second resistance of the first variable resistor 404. As such, the reference resistor 402 can be utilized to compare with the first variable resistor 404 so as to determine whether the first variable resistor 404 is programmed into the the first or second resistance. The lock bit circuit 210 includes a reference transistor 406 connected in series to the reference resistor 402. Further, the lock bit circuit 210 includes a first clamping transistor 410, a second clamping transistor 412, and the logic gate 422. The logic gate 422 is implemented as an AND gate, although other types of logic gates configured with similar functionalities can be implemented herein.

The lock bit circuit 210 is operatively (e.g., electrically) coupled to array 212 (e.g., first memory array) to indicate whether one or more cells within the array 212 has been programmed. The lock bit circuit 210 is configured to generate a lock bit 420 indicative of whether at least one of the first memory bits has been programmed. The generated lock bit 420 corresponds to an output from the logic gate 422. For example, the lock bit circuit 210 can be configured to control the OTP memory bit (e.g., the first memory bits configured as OTP memory bits) by generating the lock bit 420 to indicate whether the first memory bits are still allowed to be programmed or have been prevented from being programmed.

In various implementations, as shown in circuits 400 and 500, the reference transistor 406 and the first access transistor 408 are cross-coupled to/with each other. As shown in FIG. 4 (and/or FIG. 5), the gates of the transistors 406, 408 can be coupled to each other's drain, such as the gate of transistor 406 coupled to a first node 424 (e.g., drain of transistor 408) and the gate of transistor 408 coupled to a second node 426 (e.g., drain of transistor 406) to form the cross-coupled pair of transistors 406, 408. The cross-coupled transistors 406, 408 can be used to implemented, for instance, flip-flops, oscillators, voltage-controlled oscillators (VCOs), phase-locked loops, etc. By forming a cross-coupled circuit with reference transistor 406 and the first access transistor 408, the respective resistances between the reference resistor 402 and the first variable resistor 404 can be compared. For example, with the cross-coupled circuit, voltages at a first node 424 associated with (e.g., between) the first variable resistor 404 and the first access transistor 408 can be compared with voltages at a second node 426 associated with (e.g., between) the reference resistor 402 and the reference transistor 406. The first clamping transistor 410 and the second clamping transistor 412 are part of a clamping circuit, where the gate of the first and the second clamping transistors 410, 412 are electrically coupled to each other or connected to the same source (e.g., receiving the same control signal). In some cases, the cross-coupled circuit and/or the clamping circuit formed by the transistors can be used for comparing the resistance between the reference resistor 402 and the first variable resistor 404, for example. For example, when the first variable resistor 404 has been programmed to be less than the fixed resistance of the reference resistor 402, a first current flowing through the first variable resistor 404 may be substantially larger than a second current flowing through the reference resistor 402. In this case, the logic state corresponding to the voltage at the first node 424 (e.g., associated with the cross-coupled circuit and/or the clamping circuit) may be pulled up to '1', which can indicate that the resistance of the first variable resistor 404 is larger than the resistance of the reference resistor 402. When the first variable resistor 404 has not been programmed (e.g., having a resistance greater than the fixed resistance of the reference resistor 402), the first current flowing through the first variable resistor 404 may be substantially smaller than the second current flowing through the reference resistor 402. In this case, the logic state corresponding to the voltage at the first node 424 may be pulled down to '0,' which can indicate that the resistance of the first variable resistor 404 is comparatively lower than the resistance of the reference resistor 402. Details regarding the comparison between the resistances of the reference resistor 402 and the first variable resistor 404 are discussed below.

The lock bit 420 generated by the lock bit circuit 210 has one of two states according to inputs to the logic gate 422. One of the states may be a high logic state (e.g., lock bit 420 of '1') indicating that at least one first memory bit of the first memory array has been programmed by the controller 202. Another state is a low logic state indicating that the at least one first memory bit has not been programmed by the controller 202. To achieve or be in the high logic state, the logic gate 422 can receive multiple input signals '1', thereby generating a logic '1' as the output. To be in the low logic state, the logic gate 422 can receive at least one input signal of '0', thereby generating a logic '0' as the output.

For example, the lock bit circuit 210 includes an AND gate as the logic gate 422 having a first input 416 and a second input 418. The first input 416 is tied to the voltage sensed at the first node 424, which is determined based on whether the first variable resistor 404 has been programmed. For example, the first node 424 can be pulled up to '1' or '0' depending on whether the first variable resistor 404 has been programmed, hence, the first input 416 can also represent whether the first variable resistor 404 has been programmed. Specifically, this voltage at the first node 424 can be presented at the junction or node between the first variable resistor 404 and the first access transistor 408. The voltage is determined based on whether the at least one first memory bit (e.g., the first variable resistor 404) has the first resistance or the second resistance. For example, the first variable resistor 404 (e.g., labeled as RRAM element (RE)) can be programmed for updating the lock bit state. During the write operation (or program mode) of the first memory array (or at least one cell within the first memory array), as referred to in circuit 400, a write voltage (e.g., labeled as Vwrite) for programming the first memory bit can be applied at the terminal of the first variable resistor 404. The write voltage can be configured or predefined and is relatively greater than a read voltage (e.g., labeled as Vread) for read mode. When applied with the write voltage, the resistance of the first variable resistor 404 can correspond to (or programmed to) the first resistance (e.g., relatively high resistance) and the voltage presented by the at least one first memory bit as the first input 416 can be '0'.

In some cases, the resistance between the first variable resistor 404 and the reference resistor 402 can be compared (e.g., according to the logic state of the first node 424 and/or the second node 426). For example, during the program mode, the resistance of the first variable resistor 404 is programmed to be less than the fixed resistance of the reference resistor 402, such as less than 5K ohm compared to around greater than 50K ohm. During the read mode, the cross-coupled circuit between the first memory array and the lock bit circuit 210 can be used for comparing the resistance states of these resistors. Continuing with the example where the first variable resistor 404 has been programmed to be less than the fixed resistance of the reference resistor 402, a first current flowing through the first variable resistor 404 may be substantially larger than a second current flowing through the reference resistor 402. Accordingly, a logic state corresponding to the voltage at the first node 424 may be pulled up to '1,' while a logic state corresponding to the voltage at the second node 426 may be pulled down to '0'. As such, the first access transistor 408 can be turned off, thereby floating the first node 424. Concurrently, the reference transistor 406 cross-coupled to the first access transistor 408 can be turned on and thus, the second node 426 is pulled down to ground, or '0', which affirms the first access transistor 408 to be turned off. In the example where the first variable resistor 404 has not been programmed (e.g., having a resistance greater than the fixed resistance of the reference resistor 402), the first current flowing through the first variable resistor 404 may be substantially smaller than the second current flowing through the reference resistor 402. Accordingly, the logic state corresponding to the voltage at the first node 424 may be pulled down to '0,' while the logic state corresponding to the voltage at the second node 426 may be pulled up to '1'. As such, the first access transistor 408 can be turned on, which affirms the voltage at the first node 424 tied to ground; and the cross-coupled reference transistor 406 can be turned off, thereby floating the second node 426.

In further example, the second input 418 is configured to receive a control signal (e.g., labeled as "WR" in FIGS. 4-5) from the controller 202. The second input 418 may receive the control signal directly from the controller 202 or via an inverter. In circuits 400 and 500, the control signal from the controller 202 is applied at 414 (e.g., at the gate of the first and second clamping transistors 410, 412). A control signal '1' is used for program mode for the first variable resistor 404. As examples herein, the second input 418 corresponds to an inverted control signal from the controller 202. For example, if the controller 202 sends a control signal '1' to the component 206 (or the lock bit circuit 210), the logic gate 422 can receive an input of '0' inverted from the control signal as the second input 418. Likewise, if the controller 202 sends a control signal '0' to lock bit circuit 210, the logic gate 422 can receive an input of '1' inverted from the control signal as the second input 418.

In various scenarios, the second memory array (e.g., array 208) includes a plurality of second memory bits. Each of the second memory bits for the second memory array is configured as an MTP memory bit. For instance, each of the second memory bits is configured to be reversibly programmed between the first resistance and the second resistance (or other configurable resistances), such that the second memory bits can be programmed, re-programmed, or reset by the controller 202. In such scenarios, the second memory array may be referred to as MTP RRAM array, and the first memory array may be referred to as OTP RRAM array, for example.

In various implementations, each of the second memory bits of the second memory array may include its respective at least an access transistor (e.g., similar to transistor 408) and a resistor (e.g., similarly to the first resistance 404) coupled in series, where the second resistor having a second variable resistance. In this case, the lock bit circuit 210 is not operatively coupled to the second memory array, thereby operating as the MTP RRAM array (e.g., such as array 208 configured for MTP purposes and disconnected from the lock bit circuit 210).

Corresponding to operation 304 of FIG. 3, and referring to FIG. 4, the circuit 400 can be used to permanently program at least one of the plurality of memory bits (e.g., RRAM bits) for the first memory array based on or according to changing a resistance of the at least one memory bit (e.g., the first variable resistor 404). For example, when the lock bit circuit 210 is in (or for the lock bit circuit 210 to be in) a program mode or a write operation, the controller 202 is configured to issue or send a control signal '1'. The controller 202 applies the control signal at 414, such that the first and second clamping transistors 410, 412 are enabled (e.g., allows current flow). By enabling these clamping transistors 410, 412, the lock bit circuit 210 is configured to provide a conduction path flowing through the first variable resistor 404 to the first access transistor 408 and the first clamping transistor 410 (or one of the first or second clamping transistor 410, 412, depending on the arrangement of the components). The voltage applied at the terminal of the first variable resistor 404 is the write voltage, and the branch of the reference resistor 402 is floating during the programming mode. The second input 418 of the logic gate 422 is also '0', as the inverse of the control signal of '1'. Therefore, the lock bit 420 generated by the lock bit circuit 210 is '0' during program mode, indicating that the first memory array has not been or is being programmed.

In some variations of the circuits described herein, the control signal '1' may be configured for the read mode while the control signal '0' is configured for the program mode. In such arrangements, various elements or components of the memory device 204 can be configured, re-arranged, or updated to perform similar features or functionalities discussed herein.

Corresponding to operation 306 of FIG. 3, FIG. 5 depicts the circuit 500 including the component 206 (e.g., the first memory array (e.g., array 212) and the lock bit circuit 210) in the read mode. In various implementations, the lock bit circuit 210 can compare the resistance of the memory bit (e.g., RRAM bit) of the first memory array (e.g., the resistance of the first variable resistor 404) with the resistance (e.g., reference resistance) of the reference resistor 402 based on the logic state of the first node 424 and/or the second node 426 or the current flowing through these resistors 402, 404, which depends on whether the first variable resistor 404 is larger or smaller than the reference resistor 402. The resistances can be compared by the lock bit circuit 210 to determine whether the resistance of the first variable resistor 404 is greater than or less than the resistance of the reference resistor 402. Based on whether the resistance of the first variable resistor 404 is greater than or less than the resistance of the reference resistor 402, the lock bit circuit 210 determines whether the voltage at the node connected between the first variable resistor 404 and the first access transistor 408 is a logic '1' or a logic '0'.

For example, the controller 202 can adjust the mode of the lock bit circuit 210 to read mode. In the read mode, the read voltages (e.g., Vread) are applied at the terminal of the first variable resistor 404 and at the reference branch corresponding to the reference resistor 402 (e.g., at the terminal of reference resistor 402 opposite from the second node 426) of the lock bit circuit 210. The controller 202 applies the read voltage by triggering a switch (or by adjusting the voltage) from the write voltage line to the read voltage line (e.g., the voltage read source or the voltage write source at the terminal of the first variable resistor 404 opposite from the first node 424). Similarly, for the reference branch, the controller 202 applies the read voltage by adjusting the voltage or switching from the floating line to the read voltage line, such as at the terminal of the reference resistor 402 opposite from the terminal corresponding to the second node 426. In general, the read voltage is relatively smaller than the write voltage that is configured to change the resistance of the first variable resistor 404 when switching from read to write (e.g., Vwrite is configured to change the resistance state of the first variable resistor 404 when switching from Vread, which is relatively smaller than Vwrite, where Vread is configured to conduct current flowing via the first variable resistor 404).

Further, the cross-coupled transistors (e.g., the reference transistor 406 and the first access transistor 408) are configured to sense the resistance difference between the two branches (e.g., based on the logic state corresponding to the voltage at the first node 424 and/or the second node 426), such as between the first variable resistor 404 and the reference resistor 402. After reducing the resistance (e.g., changing from 1M ohm to 5K ohm, among other values) of the first variable resistor 404, the cross-coupled transistors determine that the resistance of the first variable resistor 404 is less than the resistance of the reference resistor 402, such as based on the logic state corresponding to the voltage at the first node 424 and/or the second node 426. As such, the logic state corresponding to the first node 424 connected to the first input 416 (or one of the two inputs) of the logic gate 422 can be '1' (e.g., the voltage at the node is at a high logic state). In various configurations, in the read mode, the controller 202 provides a control signal of '0' to the lock bit circuit 210 at 414. As such, during this read mode, the clamping transistors 410 and 412 are both turned off. The control signal (e.g., signal from 414) can be provided to an inverter as input (e.g., at input 418) for the logic gate 422. Based on the inputs 416, 418, the lock bit circuit 210 is configured to generate the lock bit 420 of '0' or '1' using the inputs 416, 418.

Corresponding to operation 308 of FIG. 3, the lock bit circuit 210 of FIGS. 4-5 can generate the lock bit 420 based on at least the comparison of the resistances between the reference resistor 402 and the first variable resistor 404. For example, depending on whether the resistance of the first variable resistor 404 is greater than or less than the resistance of the reference resistor 402, the lock bit circuit 210 can generate the lock bit 420 indicating whether the at least one memory bit (e.g., RRAM bit) has been permanently programmed or has not been programmed.

For example, if the first variable resistor 404 is not programmed or remains with the first resistance (e.g., the relatively high resistance of greater than, for instance, 1M ohm), the resistance of the first variable resistor 404 is greater than the resistance of the reference resistor 402. In response to determining that the resistance of the first variable resistor 404 is greater than the reference resistance, the voltage at the node (e.g., first node 424) between the first variable resistor 404 and the first access transistor 408 is sensed as logic '0' (e.g., the voltage at the node is at a low logic state). Specifically, since the first variable resistor 404 has not been programmed to the low resistance, a conduction path cannot be formed through itself. In such cases, the lock bit circuit 210 generates (via the logic gate 422) the lock bit 420 as logic '0' (e.g., a first logic state) indicating that the at least one memory bit has not been permanently programmed.

In another example, if the first variable resistor 404 is permanently programmed to the second resistance, the resistance of the first variable resistor 404 is less than the resistance of the reference resistor 402. In response to determining that the resistance of the first variable resistor 404 is lower than the reference resistance, the voltage at the node (e.g., first node 424) between the first variable resistor 404 and the first access transistor 408 is sensed as logic '1', which corresponds to the first input 416 to the logic gate 422. Specifically, since the first variable resistor 404 has been programmed to the low resistance, a conduction path can be formed through itself which eventually pulls the voltage at that node (e.g., first node 424) between the first variable resistor 404 and the first access transistor 408 to be equal to about Vread. As the voltage at the node is about equal to Vread (e.g., logic '1'), the reference transistor 406 is turned on, pulling the node (e.g., second node 426) between the reference resistor 402 and the reference transistor 406 to ground so as to firmly shut off the first access transistor 408. Further, the logic gate 422 receives an inverse of the control signal (e.g., labeled as "WR" at 414), such that the second input 418 is '1' during the read mode. For instance, the control signal can be provided by at least one component of the system 200, such as the RRAM controller 202. The control signal can be received at 414 (e.g., corresponding to the gates of the first and second clamping transistors 410, 412. The point 414 of the lock bit circuit 210 can be electrically connected to the second input 418 of the logic gate 422 via an inverter (not shown) configured to invert the control signal. Hence, when a control signal of '1' is received at 414, the second input 418 of the logic gate 422 can be '0', and when a control signal of '0' is received at 414, the second input 418 of the logic gate 422 can be '1'.

Because the two inputs 416, 418 at the logic gate 422 are '1', the lock bit circuit 210 (e.g., via the logic gate 422) generates or outputs the lock bit 420 of '1' (e.g., a second logic state) based on at least the voltage at the node (during the read mode). The second logic state generated by the lock bit circuit 210 indicates that the at least one memory bit has been permanently programmed. The lock bit 420 of '1' indicates that the at least one memory bit of the first memory array (or the first variable resistor 404) has been programmed. Accordingly, the first memory array or a portion of the memory arrays (e.g., one or more cells) of the memory device 204 can be configured as an OTP memory array (e.g., OTP RRAM array), thereby reducing the dimensions (of the components) and resource consumption for implementing an OTP solution because the memory device 204 does not require a separate component to implement the OTP memory array.

In one aspect of the present disclosure, a memory device is disclosed. The memory device includes a first memory array including a plurality of first memory bits, each of the plurality of first memory bits being configured as a one-time-programmable (OTP) memory bit. The memory device includes a second memory array including a plurality of second memory bits, each of the plurality of second memory bits being configured as a multi-time-programmable (MTP) memory bit. The memory device includes a lock bit circuit operatively coupled to the first memory array. The lock bit circuit is configured to generate a lock bit indicative of whether at least one of the plurality of first memory bits has been programmed.

In another aspect of the present disclosure, a memory device is disclosed. A memory device includes a first memory array including a plurality of first memory bits, each of the plurality of first memory bits comprising a first access transistor and a first resistor coupled in series, the first resistor having a first variable resistance. The memory device includes a lock bit circuit operatively coupled to the first memory array. The lock bit circuit is configured to generate a lock bit indicative of whether at least one of the plurality of first memory bits has been permanently programmed from a first resistance to a second resistance, the second resistance being substantially lower than the first resistance.

In yet another aspect of the present disclosure, a method for operating a memory device. The method includes providing a memory array including a plurality of resistive random access memory (RRAM) bits. The method includes permanently programming at least one of the plurality of RRAM bits based on changing a resistance of the at least one RRAM bit. The method includes comparing the resistance of the at least one RRAM bit with a reference resistance. The method includes generating, based on the comparison, a lock bit indicating whether the at least one RRAM bit has been permanently programmed.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a first memory array including a plurality of first memory bits, each of the plurality of first memory bits being configured as a one-time-programmable (OTP) memory bit;
   a second memory array including a plurality of second memory bits, each of the plurality of second memory bits being configured as a multi-time-programmable (MTP) memory bit; and
   a lock bit circuit operatively coupled to the first memory array;
   wherein the lock bit circuit is configured to generate a lock bit indicative of whether at least one of the plurality of first memory bits has been programmed.

2. The memory device of claim 1, wherein the plurality of first memory bits and the plurality of second memory bits are each a resistive random access memory (RRAM) bit.

3. The memory device of claim 1, wherein the lock bit has (i) a high logic state indicating that the at least one first memory bit has been programmed; and (ii) a low logic state indicating that the at least one first memory bit has not been programmed.

4. The memory device of claim 1, wherein each of the plurality of first memory bits has a first variable resistance that is formed with a first resistance and configured to be programmed to a second resistance, the second resistance being lower than the first resistance.

5. The memory device of claim 4, wherein the lock bit circuit comprises an AND gate having a first input and a second input, the first input being configured to sense a voltage presented by the at least one first memory bit, the second input being configured to receive a control signal.

6. The memory device of claim 5, wherein the voltage is determined based on whether the at least one first memory bit has the first resistance or the second resistance.

7. A memory device, comprising:
a first memory array including a plurality of first memory bits, each of the plurality of first memory bits comprising a first access transistor and a first resistor coupled in series, the first resistor having a first variable resistance; and
a lock bit circuit operatively coupled to the first memory array;
wherein the lock bit circuit is configured to generate a lock bit indicative of whether at least one of the plurality of first memory bits has been permanently programmed from a first resistance to a second resistance, the second resistance being lower than the first resistance.

8. The memory device of claim 7, wherein the lock bit circuit comprises:
a reference resistor having a fixed resistance;
a reference transistor connected to the reference resistor in series;
a first clamping transistor;
a second clamping transistor; and
an AND gate.

9. The memory device of claim 8, wherein the fixed resistance is higher than the second resistance but lower than the first resistance.

10. The memory device of claim 8, wherein the reference transistor and the first access transistor are cross-coupled to each other.

11. The memory device of claim 8, wherein when the lock bit circuit is in a program mode, the lock bit circuit is configured to provide a conduction path flowing through the first resistor to the first access transistor and one of the first or second clamping transistor.

12. The memory device of claim 8, wherein when the lock bit circuit is in a read mode, the lock bit circuit is configured to compare the first resistor with the reference resistor so as to determine a voltage at a node connected between the first resistor and the first access transistor, the node being connected to one of two inputs of the AND gate.

13. The memory device of claim 12, wherein when the first resistor has been permanently programmed to have the second resistance, the voltage at the node is at a high logic state.

14. The memory device of claim 13, wherein when the first resistor remains with the first resistance, the voltage at the node is at a low logic state.

15. The memory device of claim 14, wherein the lock bit circuit is configured to generate the lock bit based on the voltage at the node.

16. The memory device of claim 7, further comprising:
a second memory array including a plurality of second memory bits, each of the plurality of second memory bits comprising a second access transistor and a second resistor coupled in series, the second resistor having a second variable resistance;
wherein the lock bit circuit is not operatively coupled to the second memory array.

17. The memory device of claim 16, wherein each of the plurality of second memory bits is configured to be reversibly programmed between the first resistance and the second resistance.

18. A method for operating a memory device, comprising:
providing a memory array including a plurality of resistive random access memory (RRAM) bits;
permanently programming at least one of the plurality of RRAM bits based on changing a resistance of the at least one RRAM bit;
comparing the resistance of the at least one RRAM bit with a reference resistance; and
generating, based on the comparison, a lock bit indicating whether the at least one RRAM bit has been permanently programmed.

19. The method of claim 18, further comprising:
in response to determining that the resistance is greater than the reference resistance, generating the lock bit with a first logic state indicating that the at least one RRAM bit has not been permanently programmed.

20. The method of claim 18, further comprising:
in response to determining that the resistance is lower than the reference resistance, generating the lock bit with a second logic state indicating that the at least one RRAM bit has been permanently programmed.

* * * * *